April 17, 1934.  W. B. EDDISON  1,955,380

POWER TRANSMITTING MECHANISM

Filed June 20, 1929

Inventor
William Barton Eddison
By his Attorney
Arthur L. Kent

Patented Apr. 17, 1934

1,955,380

UNITED STATES PATENT OFFICE 1,955,380

POWER TRANSMITTING MECHANISM

William Barton Eddison, Irvington, N. Y.

Application June 20, 1929, Serial No. 372,313

7 Claims. (Cl. 64—106)

This invention relates to power transmitting mechanism for transmitting a definitely limited torque from one rotatable member to another. The mechanism is of value in driving machine tools and many sorts of automatic machinery in which the application of too great a torque may injure the driven member. At present it is customary to use an ordinary friction clutch for transmitting power to such machines and to rely upon the slipping of the clutch under an excess torque to protect the driven member. But, because of the variation in the torque-transmitting capacity of a friction clutch due to the difference between the static and running friction between its gripping members and the variation of the friction caused by changes in the condition and temperature of these members, such a clutch serves only as a rough and inaccurate means for limiting the torque transmitted.

My invention provides a transmission device by means of which the torque transmitted may be very accurately limited to a predetermined maximum. A transmission device embodying my invention consists essentially of a controlling mechanism and a clutch connected in series to transfer torque from a driving to a driven member. The controlling mechanism contains two relatively movable elements and a spring preventing relative displacement of the elements except when the torque transmitted from one of the elements to the other exceeds a maximum which is predetermined by the setting of the spring. When the torque exceeds this maximum, the two elements of the controlling mechanism are displaced against the force of the spring. The clutch has a torque-transmitting capacity much greater than the maximum for which the controlling device is set, and is so combined with the controlling mechanism that relative displacement of the elements of the controlling mechanism automatically releases the clutch. The clutch is preferably of a friction type to avoid jerks when it is thus automatically closed or opened.

An important feature of the invention consists in the use of one and the same spring to resist displacement of the elements of the controlling mechanism and to hold the clutch normally in closed position. A further feature of the invention, which is embodied in the specific transmission device illustrated in the drawing, consists in using the actuator of the friction clutch as one of the displaceable elements of the controlling mechanism by making it the sole connection between one of the elements of the clutch and one of the rotary members between which the torque is to be transmitted.

From the above explanation of the invention it will be understood that in its broader aspect the invention is not limited to the use of any particular type of clutch or even any particular type of friction clutch, nor to any particular physical construction of the controlling mechanism. But, in order to make the nature of the invention entirely clear, I will describe in detail a simple and practical device embodying the invention which is shown in the accompanying drawing, in which:—

Figure 1:
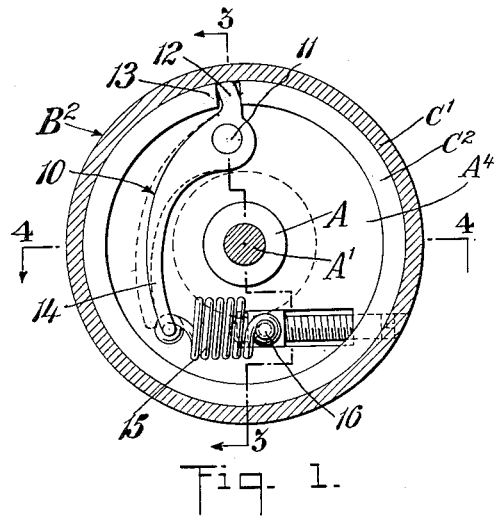
Fig. 1 is a transverse section of such a transmission device taken on the line 1—1 of Fig. 3.
Figure 2:
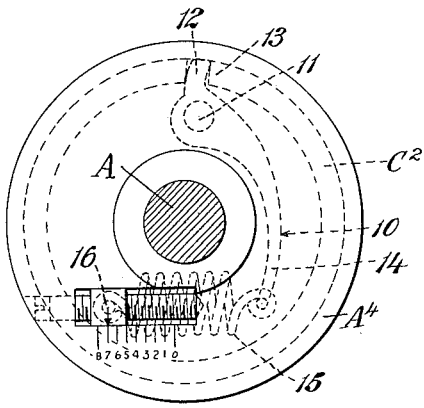
Fig. 2 is an end view of the device.
Figure 3:
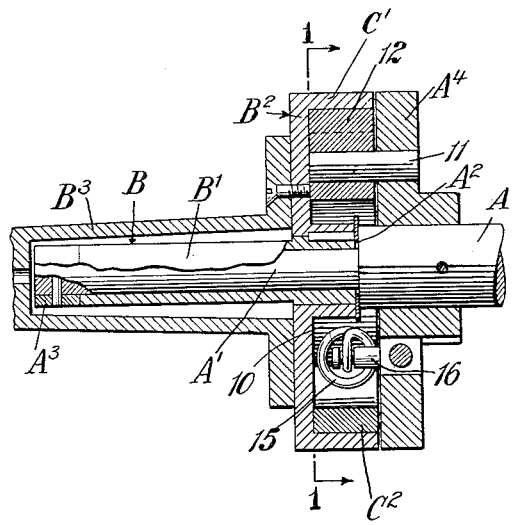
Fig. 3 is a longitudinal section taken on the line 3—3 of Fig. 1.
Figure 4:
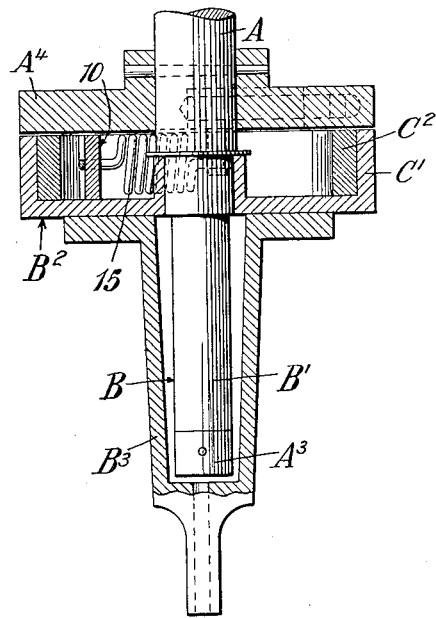
Fig. 4 is a longitudinal section taken on the line 4—4 of Fig. 1.

The transmission device illustrated is arranged to transmit power between a rotatable member A and a rotatable member B, either of which may be the driving member. In the form illustrated, the member A is a shaft having a reduced end portion A1, while the member B includes a sleeve B1 revolubly mounted on the reduced portion A1 of the shaft A between the shoulder A2 and a pinned sleeve A3, a wheel B2 pinned to the sleeve B1, and a hollow shaft B3 secured to the wheel B2 and, in the form shown, tapered to fit the socket of a drill press.

The transmitting device includes a friction clutch which is of the expanding ring type. The clutch proper consists of a fixed clutch element or drum C1 directly mounted on the wheel B2 and a movable clutch element C2 consisting of a split ring adapted to frictionally engage the drum C1 when expanded. The only torque-transferring connection between the clutch element C2 and the rotary member A consists of a lever 10 fulcrumed on a pin 11 fixed in a disk A4 which is fixed on the shaft A and having a short arm 12 engaging one end 13 of the clutch element C2 and a long arm 14 secured to one end of a tension spring 15 whose other end is fixed to an adjustable pin 16 carried by the disk A4. It will be noted that this torque-transferring connection between the clutch element C2 and the rotary member A is such that if the clutch element C2 is rotating in a clockwise direction in Fig. 1 and driving the member A, or if the member A is rotating in an anti-clockwise direction in Fig. 1 and driving the clutch element C2, the lever 10 remains in fixed relation to the disk A4 except when the torque transmitted is so great that the component of it applied to the spring 15 by the long end of the lever exceeds the tension of the spring. In that case, the lever 10 is displaced by the torque against the tension of the spring towards the position indicated in dotted lines in Fig. 1.

Such displacement of the lever 10 with respect to the disk A4 is utilized to wholly or partially open the clutch by releasing the pressure of the clutch element C2 against the clutch element C1. For this purpose the lever 10 is made to serve as the actuating member of the clutch by forming its short arm 12 as a cam which pries apart the ends of the clutch element C2 when the lever is in its normal position shown in full lines in Fig. 1, and permits an approaching movement of the ends of the clutch element C2 when the lever is in its displaced position indicated in dotted lines in Fig. 1. Since the spring 15 tends to draw the lever 10 to its normal position it serves as the spring of the clutch, holding the clutch normally closed, as well as serving to resist displacement of the lever 10 under the torque transmitted between the clutch and the rotary member A. The proportions of the friction elements, the lever and the cam, are such that the frictional grip created between the frictional elements of the clutch by the tension of the spring is capable of transmitting a torque much greater than the torque which will displace the lever 10 against the force of the spring. This remains true for any tension to which the spring may be adjusted by moving the pin 16.

The transmission device which has been described may be utilized either to transfer power from the member B to the member A or vice versa, but in the former case the rotation must be clockwise (Fig. 1), and in the latter anti-clockwise (Fig. 1). Since the torque-transmitting capacity of the clutch C1, C2 greatly exceeds the maximum torque to be transmitted, no slippage occurs except when the clutch is wholly or partly released by a yielding of the spring 15 under the torque between the clutch element C2 and the member A. The response of the spring occurs always at the same amount of torque whether the torque be increasing or decreasing. The device thus serves to transmit power from one rotary member to another while accurately limiting the maximum torque transferred to a predetermined amount established by the setting of the adjustable pin 16 to which one end of the spring is secured.

What I claim is:

1. A device for transmitting from one rotatable member to another a torque limited to a predetermined maximum, comprising a clutch and a torque-transferring controlling mechanism connected in series between said rotary members and mounted on one of said rotary members and directly coupling said last mentioned member to said clutch, the clutch being capable of transmitting a torque greater than said maximum, and the controlling mechanism being arranged to open the clutch when the torque applied to it rises above said maximum and to close the clutch when the torque applied to it falls below said maximum.

2. A device for transmitting a limited torque between two rotatable members, comprising a friction clutch, a clutch actuator connected to transfer torque between one of the rotary members and the clutch and to be urged by said torque into a position to open the clutch, and a spring urging said actuator into position to close the clutch, both said displaceable elements and said spring being mounted on one and the same of said rotatable members.

3. A device for transmitting a limited torque from one rotatable member to another, comprising a friction clutch, a direct connection between one of the elements of the clutch and one of the rotary members, a clutch actuator, a direct connection between said actuator and the other of said rotary members and a clutch-closing spring which together with said actuator serves as the sole torque-transmitting connection between the other element of the clutch and said other rotary member.

4. Means for transmitting a limited torque from one rotatable member to another, comprising a first friction element fixed to the first rotatable member, a second friction element, a torque-transmitting lever fulcrumed on the second rotatable member and having an arm engaging said second friction element and adapted to urge it against the first friction element when the lever is turned in one direction, and a spring reacting between the lever and the second rotatable member and urging the lever in said direction against the torque applied thereto.

5. A device for transmitting a limited torque from one rotatable member to another, comprising a friction drum mounted on one rotatable member, a disk mounted on the other rotatable member, a split ring adjacent to the inner surface of said drum, a lever fulcrumed on said disk and having an arm formed as a cam to wedge apart the ends of the split ring when the lever is turned in one direction and to release the ends of the ring when the lever is turned in the opposite direction, and a spring reacting between the lever and the disk and urging the lever into position to wedge apart the ends of the ring.

6. A device for transmitting a limited torque from one rotatable member to another, comprising a friction drum mounted on one rotatable member, a disk mounted on the other rotatable member, a split ring adjacent to the inner surface of said drum, a lever fulcrumed on said disk and having an arm formed as a cam to wedge apart the ends of the split ring when the lever is turned in one direction and to release the ends of the ring when the lever is turned in the opposite direction, a pin adjustably mounted on said disk, and a spring reacting between the lever and said pin and urging the lever into position to wedge apart the ends of the ring.

7. A device for transmitting a limited torque from one rotatable member to another, comprising a first friction element fixed to one of said rotatable members, a second movable friction element adapted to engage the first friction element and mounted for limited circular movement with respect to the other rotatable member, such relative movement in the direction against the torque increasing the friction between said clutch elements and movement in the opposite direction decreasing such friction, and a spring mounted on said other rotatable member arranged to urge the movable clutch element in the first direction and to resist the thrust of the movable clutch element in the second direction.

WILLIAM BARTON EDDISON.